United States Patent [19]

Mizuno et al.

[11] 4,364,881

[45] Dec. 21, 1982

[54] CONTINUOUS EXTRUSION METHOD OF MANUFACTURING CERAMIC HONEYCOMB STRUCTURES WITH THE AID OF SCREW TYPE VACUUM EXTRUDING MACHINE

[75] Inventors: Hiroshige Mizuno, Rye, N.Y.; Akiyoshi Kurishita, Kasugai, Japan

[73] Assignee: NGK Insulators, Ltd., Nagoya, Japan

[21] Appl. No.: 234,606

[22] Filed: Feb. 17, 1981

Related U.S. Application Data

[63] Continuation of Ser. No. 820,247, Jul. 29, 1977, abandoned.

[30] Foreign Application Priority Data

Aug. 10, 1976 [JP] Japan .................................. 51-94550

[51] Int. Cl.³ .................................. B29D 23/04

[52] U.S. Cl. .................................. 264/40.7; 264/209.1

[58] Field of Search .................. 264/209, 177 R, 40.7

[56] References Cited

U.S. PATENT DOCUMENTS 3,790,654 2/1974 Bagley .................................. 264/209

3,824,196 7/1974 Benbow .................................. 264/209

3,919,384 11/1975 Cantaloupe .................................. 264/209

*Primary Examiner*—John A. Parrish

*Attorney, Agent, or Firm*—Stevens, Davis, Miller & Mosher

[57] ABSTRACT

A continuous extrusion method of manufacturing ceramic honeycomb structures with the aid of a screw type vacuum extruding machine is disclosed. The method is characterized by making the temperature at the outer periphery of the ceramic raw material batch located in the rear of the extrusion die not lower than the temperature at the center portion of the batch.

4 Claims, 1 Drawing Figure

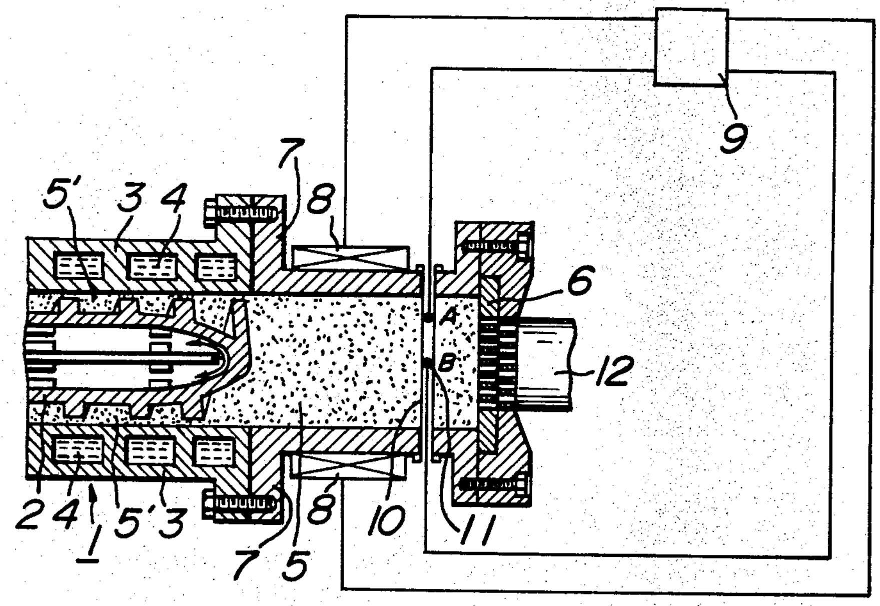
5'
3
4
7
8
9
6
A
B
12
2
4
1
5'
3
7
5
8
10
11

CONTINUOUS EXTRUSION METHOD OF MANUFACTURING CERAMIC HONEYCOMB STRUCTURES WITH THE AID OF SCREW TYPE VACUUM EXTRUDING MACHINE

This is a continuation of application Ser. No. 820,247 filed July 29, 1977, now abandoned.

BACKGROUND OF THE INVENTION

This invention relates to a continuous extrusion method of manufacturing ceramic honeycomb structures with the aid of a screw type vacuum extruding machine, comprising continuously extruding a ceramic raw material batch through an extrusion die of the screw type vacuum extruding machine.

As a method of manufacturing ceramic honeycomb structures for use in catalyst supports for a device for purifying exhaust gases from internal combustion engines, various kinds of works, heat power plant and the like or from various kinds of chemical industries, etc., a method of extruding extrudable plastic raw material batches with the aid of a ram type extruding machine has heretofore been known.

But, such conventional method has drawbacks that the extrusion operation is intermittent and hence could not be effected in mass production scale, and that replacement of the batches for fresh batches and deairing step thereof are complex in operation. In addition, in order to obtain good extruded articles, the temperature of the extrudable raw material batch must be made substantially equal to the temperature of an extrusion cylinder to which is supplied the extrudable raw material batch. In practice, the heat conductivity of the extrudable raw material batch is different from that of the metallic extrusion cylinder. As a result, a slight temperature change causes an optimum extrusion condition to be degraded and hence there is a risk of the extruded articles being cracked and broken. Thus, it is extremely difficult to manufacture the extruded articles with a high yield.

On the one hand, in the ceramic field, it has been known that a continuous extrusion method which makes use of a screw type vacuum extruding machine is extremely excellent in its mass productivity. But, in the case of extruding structures such as a ceramic honeycomb structure composed of a thin-walled structure through an extrusion die having a small overall extrusion area and an extremely high extrusion resistance, it is required to use a very high extrusion pressure. As a result, between a screw of the screw type vacuum extruding machine and extrudable raw material batch is generated a high friction heat, so that the temperature of the extrudable raw material batches extruded by the screw becomes high at its center portion and that the temperature distribution in the extrudable raw material batch becomes non-uniform. As a result, it is impossible to obtain a uniform extrusion speed and hence there is a risk of the extruded article being cracked and broken. Thus, it has heretofore been almost impossible to manufacture a good article by the continuous extrusion method.

SUMMARY OF THE INVENTION

An object of the invention, therefore, is to provide a continuous extrusion method of manufacturing ceramic honeycomb structures with the aid of a screw type vacuum extruding machine, which can eliminate all of the drawbacks which have been encountered with the prior art techniques.

After various investigations, the inventors have discovered a continuous extrusion method which is capable of manufacturing good ceramic honeycomb structures with the aid of a screw type vacuum extruding machine.

A feature of the invention is the provision, in a continuous extrusion method of manufacturing ceramic structures comprising extruding a ceramic raw material batch through an extrusion die of a screw type vacuum extruding machine, of the improvement comprising making the temperature at the outer periphery of the batch located in the rear of the extrusion die not lower than the temperature at the center portion of the batch.

In carrying out the invention, it is preferable that a temperature difference between the temperature at the outer periphery of the batch in the rear of the extrusion die and the temperature at the center portion of the batch is made lower than 10° C., preferably 0.5° C. to 5° C. calculated on the basis of a value measured in the batch located at a position which is separated from the extrusion die toward a screw side by 40 mm.

In addition, it is preferable to cool beforehand the extrudable material batch by means of a cooling medium circulating through a cylinder surrounding at least the screw of the screw type vacuum extruding machine for the purpose of preventing the temperature of the extrudable raw material batch from becoming extremely high by friction heat to be generated therebetween.

BRIEF DESCRIPTION OF THE DRAWING

The invention will now be described in greater detail with reference to the accompanying drawing, wherein a single FIGURE is a cross sectional view of one embodiment of a screw type vacuum extruding machine used for carrying out a method according to the invention.

DESCRIPTION OF THE PREFERRED EMBODIMENT

Referring to the drawing, a screw type vacuum extruding machine 1 comprises a screw 2 and a cylinder 3 surrounding the screw 2. At least the cylinder 3 surrounding the screw 2 is cooled by a cooling medium 4 such as water, ethylene glycol water solution and the like so as to cool beforehand an extrudable raw material batch 5' supplied under pressure by the screw 2 and composed of cordierite, mullite, alumina and the like. Such cooling makes it possible to not only adjust the temperature of the extrudable raw material batch 5' so as to prevent the temperature of the extrudable raw material batch 5 from becoming extremely high due to friction heat and degrading the workability of the extruding machine, but also prevents the extrudable raw material batch 5' between the screw 2 and the cylinder 3 surrounding the screw 2 from flowing in a reverse direction, thereby enabling an extrusion under a high pressure. Between the cylinder 3 surrounding the front end of the screw 2 of the screw type vacuum extruding machine 1 and a honeycomb extrusion die 6 is arranged a hollow cylinder 7 having an inner diameter which is substantially equal to the inner diameter of the cylinder 3. Around the hollow cylinder 7 is surrounded a band heater 8 which functions to heat the outer periphery of the extrudable raw material batch 5 in the hollow cylinder 7.

The band heater 8 is connected to an automatic temperature adjusting device 9 which functions to automatically control an electric current flowing through the band heater 8 such that the temperature of that extrudable raw material batch 5 which is located at a position A which corresponds to substantially the outermost periphery of an extruded honeycomb structure 12 and which is positioned in the rear of the honeycomb extrusion die 6 and spaced apart therefrom toward the screw 2 by substantially 40 mm is made not lower than the temperature of that extrudable raw material batch 5 which is located at a position B which corresponds to a center portion of the batch. It is preferable that the temperature difference between the temperatures at both the positions A and B is smaller than 10° C., preferably 0° C. to 10° C., more preferably, 0.5° C. to 5° C. In order to measure the temperature of the extrudable raw material batch 5 located at both the positions A and B and control those temperatures to the above mentioned temperature range, provision is made for a guard tube 10 located at a position which is spaced apart from the honeycomb extrusion die 6 toward the screw 2 by about 40 mm. The guard tube 10 is extended through the hollow cylinder 7 in its diametrical direction and is composed of a diamond or stream line-shaped solid tube, for example, steel tube which can withstand against the extrusion pressure of the extrudable material batch 5 subjected thereto. In the guard tube 10 are inserted a pair of opposed temperature measuring members 11 composed of a pair of thermocouples, for example, chromel-alumel thermocouples, located at the A and B positions, respectively. The thermocouples function to measure the temperature of the A and B positions and detect the temperature difference therebetween. In this case, the automatic temperature adjusting device 9 functions to bring the above mentioned temperature difference into the above mentioned predetermined temperature range.

It is preferable to separate the guard tube 10 from the honeycomb extrusion die 9 by a distance longer than 20 mm such that the extrudable material batch 5 divided into two halves by the guard tube 10 can be made integral into one body again which then arrives at the back of the extrusion die 6.

It is not always necessary to cause the band heater 8 to heat the outer periphery of the hollow cylinder 7. Alternatively, the band heater 8 may be embedded into the hollow cylinder 7. In addition, it is a matter of choice that the hollow cylinder 7 may be heated by any heating means other than the electric heater.

As stated hereinbefore, in the continuous extrusion method according to the invention, an extrudable material raw batch composed of ceramic material powders formed of cordierite, mullite, alumina and the like and the bonding agent added thereto and kneaded therewith is fed into the screw type vacuum extruding machine 1, vacuum deairing is effected and subsequently the deaired batch is fed under pressure into the hollow cylinder 7 by means of the screw 2 while cooling at least the cylinder 3 surrounding the screw 2. As a result, the extrudable raw material batch 5 is heated through the wall surface of the hollow cylinder 7 and the heat is conducted from the outer periphery of the hollow cylinder 7 to the center portion of the batch 5. Since the extrudable material batch 5 is continuously extruded, the outer periphery of the extrudable material batch 5 is subjected to much more heat than the center portion thereof. Thus, the temperature of the extrudable material batch 5 located in the hollow cylinder 7 and subjected at its center portion to much more heat due to the friction heat with the screw 2 becomes substantially balanced with the temperature at the outer periphery of the extrudable raw material batch 5. As a result, temperature distribution in the extrudable raw material batch 5 becomes uniform.

The extrudable raw material batch 5 at the above mentioned position A is heated to a temperature which is equal to or slightly higher than the temperature of the extrudable raw material batch 5 at the above mentioned position B. The higher the temperature is, the higher the fluidity of the extrudable raw material batch 5 becomes. As a result, the extruding speed of the outer periphery of the extruded honeycomb structure 12 becomes slightly higher than that of the center portion thereof. Thus, the honeycomb structure 12 is extruded through the extrusion die 6 under a condition that tends to make its extruded front surface flat or slightly concave. The extrusion under such condition is an optimum condition for forming the ceramic honeycomb structure by continuous extrusion. The above described method according to the invention is a method of extruding the honeycomb structure in which the honeycomb structure has been subjected before hand to internal compressive stress. This internal compressive stress functions to prevent the honeycomb structure from being subjected to cracks to be produced at the following drying and sintering steps.

In general, the temperature of the extrudable raw material batch 5 passing through the hollow cylinder 7 and located at the position B changes in dependence not only with the temperature or amount of the extrudable raw material batch to be supplied to the screw type vacuum extruding machine 1 but also with the outside atmospheric temperature. The optimum extrusion result is obtained under such condition that the temperature at the position A is higher than the temperature at the position B with the temperature difference ranging of the order of 0° C. to 10° C., preferably 0.5° C. to 5° C. irrespective of the above described temperature changes.

If said temperature difference exceeds 10° C., the front surface of the extruded honeycomb structure is deformed into one of excessively concaved. Such deformation results in clogging of passages of the honeycomb structure and acts as sources for so-called vacuum recesses due to deairing under a reduced pressure. Conversely, if the temperature at the position A becomes lower than the temperature at the position B, the extruding speed at the outer periphery of the honeycomb structure 12 becomes low, so that the extruded front surface becomes convex and the extruded article tends to be cracked and broken.

As seen from the above, it is most important to control the temperature at the position A of the extruded raw material batch to a temperature range which is higher than the temperature at the position B with the temperature difference ranging on the order of 0° C. to 10° C.

Even when the temperature at any other portions of the extrudable raw material batch 5 than the positions A and B is measured and controlled, the same effect as the present invention may be obtained provided the temperature difference thus measured and calculated on the basis of the value measured in the batch 5 located at the position separated from the extrusion die toward the screw side by 40 mm is lower than 10° C.

The invention will now be described with reference to a practical example.

3 parts by weight of starch paste and 32 parts by weight of water were added to and kneaded with 100 parts by weight of cordierite powders to form an extrudable cordierite batch. 4 parts by weight of starch paste and 30 parts by weight of water were added to and kneaded with 100 parts by weight of mullite powders to form an extrudable mullite batch. Use was made of 3 kinds of screw type vacuum extruding machines shown in the drawing and having different diameters of 100 mmϕ, 200 mmϕ and 250 mmϕ, respectively. The temperatures of these extrudable raw material batches were automatically adjusted to those shown in the following Table 1 and honeycomb structures having various kinds of configurations shown in the Table 1 were formed by continuous extrusion. The results obtained are shown in the Table 1 which also shows reference example in which the extrudable material batches were adjusted to those temperatures which are out of the range defined by the invention and conventional example in which the conventional method was used to form a honeycomb structure.

TABLE 1

| Method | No. | Ceramic* raw material | Extruding machine diameter (mmϕ) | Honeycomb configuration (mm) (three dimensions or diam. × length) | Cell configuration | Thickness of thin wall (mm) | Cell pitch (mm) | Temperature of extrudable raw material batch: Temperature at position A $T_A$ (°C.) | Temperature at position B $T_B$ (°C.) | Temperature difference between positions A and B $T_A - T_B$ (°C.) | Extruded result ○ Best ○ Better x Worse |
|---|---|---|---|---|---|---|---|---|---|---|---|
| The invention | 1 | Cordierite | 100 | $50 \times 50 \times 50^{L}$ | Square | 0.3 | 1.8 | 36 | 36 | 0 | ○ |
| | 2 | Cordierite | 200 | $118^{\Phi} \times 150^{L}$ | Hexagonal | 0.3 | 1.0 | 49 | 48 | 1 | ○ |
| | 3 | Mullite | 200 | $118^{\Phi} \times 150^{L}$ | Hexagonal | 0.3 | 1.0 | 48 | 47 | 1 | ○ |
| | 4 | Cordierite | 200 | $118^{\Phi} \times 150^{L}$ | Hexagonal | 0.3 | 1.0 | 52 | 49 | 3 | ○ |
| | 5 | Cordierite | 200 | $118^{\Phi} \times 150^{L}$ | Hexagonal | 0.3 | 1.0 | 55 | 50 | 5 | ○ |
| | 6 | Mullite | 200 | $118^{\Phi} \times 150^{L}$ | Hexagonal | 0.3 | 1.0 | 54 | 49 | 5 | ○ |
| | 7 | Cordierite | 200 | $118^{\Phi} \times 150^{L}$ | Hexagonal | 0.3 | 1.0 | 58 | 51 | 7 | ○ |
| | 8 | Cordierite | 250 | $150 \times 150 \times 100^{L}$ | Square | 2.5 | 4.0 | 66 | 56 | 10 | ○ |
| Reference example | 9 | Cordierite | 100 | $50 \times 50 \times 50^{L}$ | Square | 0.3 | 1.8 | 35 | 36 | −1 | x |
| | 10 | Mullite | 200 | $118^{\Phi} \times 150^{L}$ | Hexagonal | 0.3 | 1.0 | 46 | 47 | −1 | x |
| | 11 | Cordierite | 250 | $150 \times 150 \times 100^{L}$ | Square | 2.5 | 4.0 | 67 | 56 | 11 | x |
| Conventional example | 12 | Cordierite | 200 | $118^{\Phi} \times 150^{L}$ | Hexagonal | 0.3 | 1.0 | 44 | 68 | −24 | x |

*As the ceramic raw material, use may be made of raw materials which can produce the given ceramic by sintering. For example, a mixture containing given amounts of clay, alumina and talc may be used for the purpose of obtaining a cordierite ceramic honeycomb.

As seen from the above Table 1, the continuous extrusion method of manufacturing extruded articles from an extrudable raw material batch according to the invention, comprising a step of making the temperature at the position A of the extrudable raw material batch higher than the temperature at the position B with the temperature difference ranging from 0° C. to 10° C., can provide an extruded honeycomb structure having a desired property in a continuous manner.

As stated hereinbefore, the continuous extrusion method of manufacturing extruded ceramic honeycomb structures from an extrudable raw material batch with the aid of a screw type vacuum extruding machine according to the invention, comprises the step of heating the hollow cylinder located between the cylinder and the honeycomb extrusion die and making the temperature of the extruded raw material batch at the position A separated from the honeycomb extrusion die toward the screw side by 40 mm equal to or higher than the temperature of the outermost surface of the extruded raw material batch at a position B located on the center portion thereof and on the center axis of the honeycomb extrusion die with the temperature difference ranging from 0° C. to 10° C. The use of the measure described ensures an ability of providing a continuous method of manufacturing ceramic honeycomb structures which has heretofore not been accomplished with the aid of the conventional screw type vacuum extruding machine. The method according to the invention can be applied to the case of continuously extruding ceramic honeycomb structures for use in various kinds of catalyst supports, is excellent in mass productivity and contributes greatly to the industry of manufacturing ceramic honeycomb structures.

What is claimed is:

1. In a continuous extrusion method of manufacturing ceramic honeycomb structures comprising extruding a ceramic raw material batch through an extrusion die of a screw type vacuum extruding machine, the improvement comprising the step of adjusting a temperature differential between the center and periphery of a section of the raw material batch by passing the raw material batch between a first cylinder provided with a cooling means and a rotating screw and further passing the raw material batch through a second hollow cylinder provided with a heating means for heating the periphery of the raw material batch, said section being parallel to said die and located 40 mm from said die, and the relation between the temperature (Tp) of said periphery and the temperature (Tc) of said center at said section being 10° C.$>$Tp−Tc$\geqq$0.5° C.

2. The method according to claim 1, wherein said relation is $5 \geqq Tp - Tc \geqq 0.5$.

3. A continuous extrusion method of manufacturing ceramic honeycomb structure comprising extruding a ceramic raw material batch through a rotating screw type vacuum extruding machine with pressure to a first cylinder provided with a cooling means, cooling said ceramic raw material batch between said rotating screw and said first cylinder during passing therethrough, heating said ceramic raw material batch on a periphery section of a second hollow cylinder provided with a heating means during passing therethrough, adjusting a temperature difference between the center and periphery of a section of said ceramic raw material batch such that the relation between the temperature (Tp) of said periphery and the temperature (Tc) of said center is $10^\circ\ C. > Tp - Tc \geqq 0.5^\circ\ C.$, wherein said section is parallel to an extruding die and located 40 mm from said die, and extruding said ceramic raw material batch through said extruding die.

4. A method as defined in claim 3, wherein the ceramic raw material is kneaded with a starch paste as a fluidizing binder before extruding by screw.

* * * * *